United States Patent [19]

Jankowitz

[11] 4,284,323
[45] Aug. 18, 1981

[54] TRICHROIC MIRROR

[75] Inventor: Gerald Jankowitz, Hillsdale, N.J.

[73] Assignee: International Telephone and Telegraph Corporation, New York, N.Y.

[21] Appl. No.: 24,912

[22] Filed: Mar. 28, 1979

[51] Int. Cl.³ .............................................. G02B 5/22
[52] U.S. Cl. .................................... 350/1.6; 350/164; 350/288; 350/311
[58] Field of Search .................. 350/1.1, 1.6, 1.7, 164, 350/166, 288, 311, 316, 318

[56] References Cited

U.S. PATENT DOCUMENTS

| | | | |
|---|---|---|---|
| 2,924,142 | 2/1960 | Nomarski | 350/166 X |
| 2,983,786 | 5/1961 | Rogers | 350/166 X |
| 3,089,386 | 5/1963 | Hunt | 350/316 X |
| 3,372,282 | 3/1968 | Bressler | 350/166 UX |
| 3,498,693 | 3/1970 | Fein et al. | 350/166 UX |
| 3,589,811 | 6/1971 | Berger | 350/311 X |
| 3,624,272 | 11/1971 | Favreau | 350/166 X |
| 3,901,588 | 8/1975 | Longhenry | 350/318 X |

Primary Examiner—Conrad J. Clark
Assistant Examiner—John D. Lee
Attorney, Agent, or Firm—John T. O'Halloran; Alfred C. Hill

[57] ABSTRACT

A trichroic mirror comprising an optical wedge having two multilayer dielectric interference filters, one disposed on a front surface of the wedge and the other disposed on a back surface of the wedge with the back surface being tilted in a given direction and at a given wedge angle with respect to the front surface, and a reflecting element spaced from the back surface and tilted in a direction opposite to the given direction and at an angle equal to the given wedge angle with respect to the front surface. This mirror separates incident radiation into three spectral bands, all of which may be detected by a single detector in time sequence.

12 Claims, 6 Drawing Figures

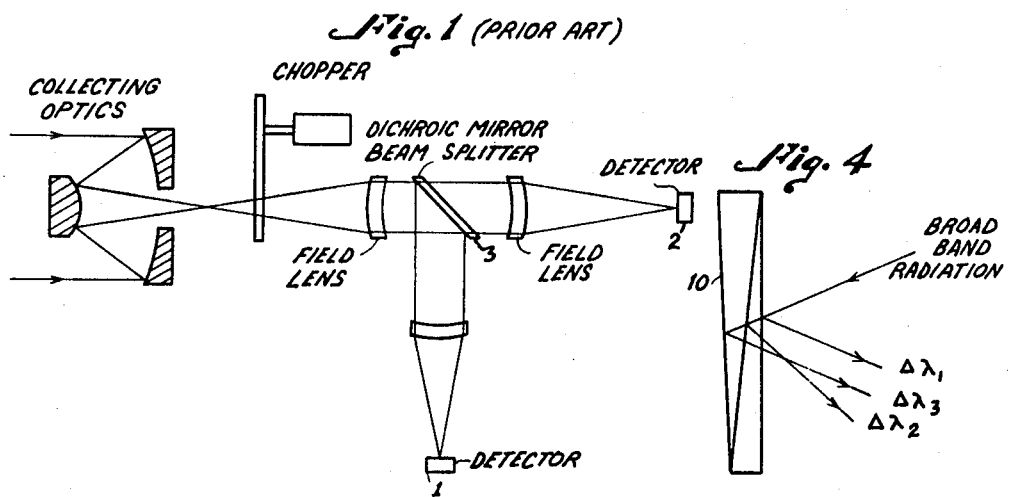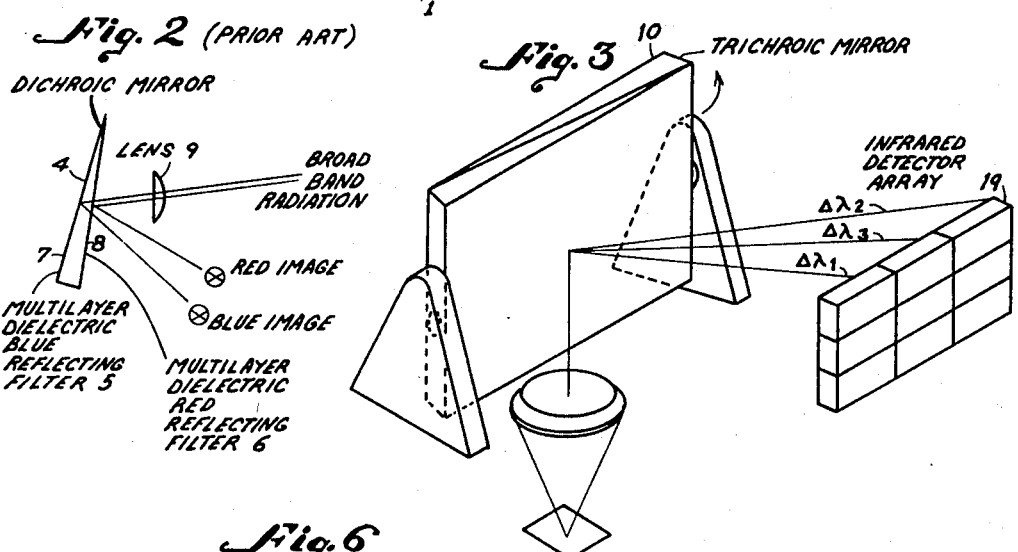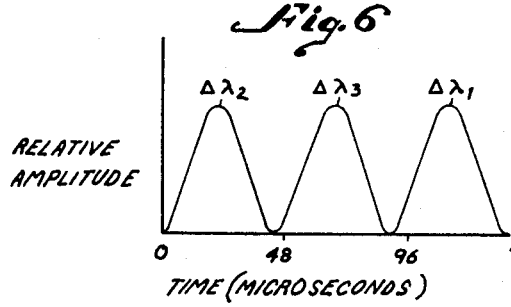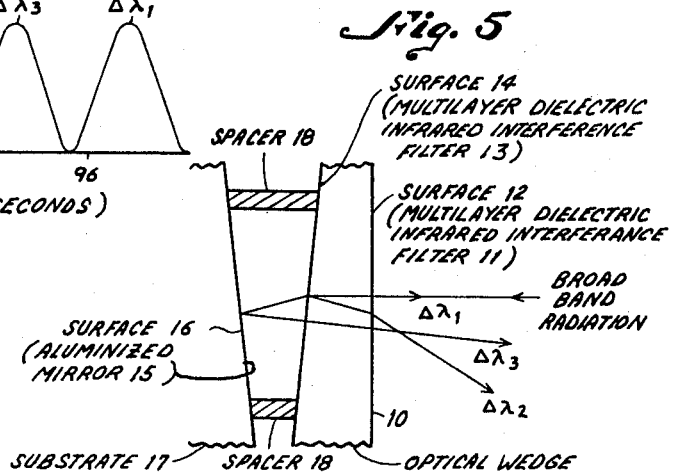

TRICHROIC MIRROR

BACKGROUND OF THE INVENTION

The present invention relates to optical filters and more particularly to an arrangement to separate incident radiation into a plurality of spectral bands.

In prior art arrangements the incident radiation is separated by a plurality of optical filters into a plurality of different spectral bands and each of the bands is detected by a different one of a corresponding plurality of detectors. The disadvantage of such an arrangement is the cost and reliability thereof.

It has been demonstrated that a layer of dielectric material, applied to the polished faces of an optical material, can change the reflection characteristics of the surface due to impedance mismatch with the surrounding medium. If the refractive index of the coating is intermediate the refractive index of the surrounding medium and the optical material or substrate, then the reflection is reduced (the principle of anti-reflection coatings). If the refractive index of the coating aggravates the mismatch, the reflection is enhanced. This matching effect varies with wavelength. It is greatest when the coating is an odd number of quarter wavelengths in optical thickness, and there is no effect when it is a multiple of one-half wavelength in optical thickness.

Employing multiple layers of dielectric material of alternate high and low refractive index can significantly enhance the reflectivity over a specified wavelength region.

Stacks of only a few quarter-wavelength layers using the high refractive index materials available in the infrared spectral region can have very high reflectance. For example, if the first medium is air with a refractive index $n=1$, the high index coating is Germanium ($n=4$), the low refractive index material is silicon monoxide ($n=1.32$), and the substrate is quartz, the following reflectance levels can be produced:

| Number of Layers | Reflectance |
| --- | --- |
| 1 | 0.701 |
| 2 | 0.962 |
| 3 | 0.998 |

The use of sets of quarter-wavelength layers separated by half-wavelength spacer layers can produce the equivalent of multiple coupled circuits in an electronic filter.

Just as one can design a filter with a center frequency, specific passband and specific skirt selectivity, so can the multilayer interference filter be tailored.

Commercial filters have been produced from the near ultraviolet to the microwave region. In fact, a terminated transmission line or waveguide is directly analogous to the interference filter.

Interference filters are made by vacuum deposition of alternate layers of high and low refractive index material onto a suitable substrate. The substrate must, of course, transmit in the region in which the filter is desired to transmit.

In selecting material for the layers of the filter, the wavelength regions of good transmission, its hardness, freedom from contamination, ease of deposition, and temperature characteristics must be considered. Some candidate materials in the 3 to 5 micron region are Germanium, Zinc Sulfide, and Chiolite (sodium aluminum fluoride).

SUMMARY OF THE INVENTION

An object of the present invention is to provide a trichroic mirror to provide spectral separation of incident radiation into three spectral bands, each of which may be detected by a single detector in time sequence.

Another object of the present invention is to provide a trichroic mirror employing multilayer dielectric interference filters.

Still another object of the present invention is to provide a trichroic mirror employing multilayer dielectric interference filters operating in the infrared spectral region.

A feature of the present invention is the provision of a trichroic mirror comprising: an optical wedge having a first multilayer dielectric interference filter disposed on a front surface of the wedge and a second multilayer dielectric interference filter disposed on a back surface of the wedge, the back surface being tilted in a given direction and at a given wedge angle with respect to the front surface; and a reflecting element spaced from the back surface and tilted in a direction opposite the given direction and at an angle equal to the given wedge angle with respect to the front surface.

Another feature of the present invention is the provision of a trichroic mirror comprising: a dichroic mirror having a back surface and a front surface upon which broad band radiation is incident; and a reflecting element spaced from the back surface and tilted at a given angle with respect thereto; the dichroic mirror and the reflecting element cooperating to produce three separate reflected beams.

BRIEF DESCRIPTION OF THE DRAWING

Above-mentioned and other features and objects of this invention will become more apparent by reference to the following description taken in conjunction with the accompanying drawing, in which:

FIG. 1 is a schematic diagram of a two-color optical radiometer known in the prior art;

FIG. 2 is a schematic illustration of a known two-color dichroic beam splitter;

FIG. 3 is a perspective view illustrating the operating principle of a trichroic mirror in accordance with the principles of the present invention;

FIG. 4 is a schematic illustration of a trichroic mirror in accordance with the principles of the present invention illustrating the generation of three separate spectral beams;

FIG. 5 is a sectional view of a portion of the trichroic mirror of FIG. 4; and

FIG. 6 is a curve illustrating the spectrally multiplexed signal produced by a single detector responding to the output of the trichroic mirror in accordance with the principles of the present invention.

DESCRIPTION OF THE PREFERRED EMBODIMENT

The concept of highly efficient reflectance and tight control of the spectral passband employing multi-layer dielectric interference filters has been used in the past to produce dichroic mirrors for use in radiometers. These optical elements serve as spectral beam splitters. An example is shown in FIG. 1. In this instance, two detectors 1 and 2 operating in different spectral passbands share a common optical system including the dichroic mirror beam splitter 3. Using beam splitter 3, simultaneous signal information in two spectral regions is generated. Detector 1 receives the radiation after reflecting off beam splitter 3 and detector 2 receives the radiation after transmission through the same beam splitter 3. Efficiency of better than 95% can be achieved in each passband with better than 90% common.

The trichroic mirror concept is the inverse of the technique described in the previous paragraph. This approach allows a single detector to sample the incident radiation in three adjacent spectral regions in time sequence.

The technique is best described by starting with the concept of a dichroic mirror and two output signals. FIG. 2 illustrates this simplified approach. An optical wedge 4 is provided with multilayer dielectric interference filters 5 and 6 on each of its two surfaces 7 and 8. A point target is focused by a lens 9 to produce an image at wedge 4. Wedge 4 bends the beam through an angle determined by the orientation of the surface relative to the optical axis. Since there are two surfaces 7 and 8 on wedge 4, two images of the target are produced. If filter 6 on front surface 8 reflects red light and filter 5 on back surface 7 reflects blue light, one resultant image is red and the other resultant image is blue. The optical-mechanical geometry is arranged to rotate the mirror in such a fashion that the red and blue images scan across a detector. This produces two pulses in time sequence.

Referring to FIGS. 3 and 4, there is illustrated therein a trichroic mirror 10 operating in the infrared spectral region using three reflecting surfaces as will be described hereinbelow. In this arrangement, there are three reflected beams. These are $\Delta\lambda_1$ in the 3.5 to 4 micron range, $\Delta\lambda_2$ in the 4.0 to 4.8 micron range and $\Delta\lambda_3$ in the 4.8 to 5.5 micron range. The angles between the surfaces are arranged so that the leading signal is that produced by the 4.0 to 4.8 micron band beam. This is called the primary detection band.

The trichroic mirror is a thin rectangular wedge 3 by 5 inches in dimension and 0.125 inches thick. A portion of this wedge is shown in FIG. 5. The wedge angle is 2.59 minutes of arc (0.75 mr (milliradians)) to produce a total of 6 mr separation between the beam reflected off the multilayer dielectric infrared interference filter 11 deposited on front surface 12 of wedge 10 and the beam reflected from the multilayer dielectric infrared interference filter 13 deposited on the back surface 14 of wedge 10. Wedge 10 is spaced away from a totally aluminized mirror 15 deposited on surface 16 of substrate 17 by the use of a plurality of mechanical spacers 18. Mirror 15 is tilted at a wedge angle of 2.59 minutes of arc (0.75 mr) in the opposite direction relative to front surface 12 of wedge 10. The beam off mirror 15 then lands between the first two beams. Therefore, three beams, 3 mr apart, are produced. Optics (not shown) focus the three beams on three spots on a focal plane in which an infrared detector array 19 (FIG. 3) is disposed.

As mirror 10 (FIG. 3) rotates in azimuth, these three spots sweep across a single one of the detectors in array 19 producing a pulse triplet. The amplitude of each pulse is proportional to the received signal in a specific spectral passband.

The timing of these signals (pulsewidth and spacing) is produced by the mechanical characteristic of the arrangement moving trichroic mirror 10. The rotation of mirror 10 covers 360° in azimuth in 0.1 second. Every detector of array 19 subtends an angle of 1 milliradian in azimuth (17.4 mr/°). Thus, there are 6264 detector widths in 0.1 second. The pulsewidth produced by a detector scanned by a point target is 16 microseconds. Since the three images are separated by 3 mr, the pulse spacing is 48 microseconds.

The actual images have a finite diameter which causes the individual signals to have a finite rise and fall time. The worse case produces a 16 microsecond rise and fall. Under these circumstances, the pulse group shown in FIG. 6 is produced by a single detector of array 19.

While I have described above the principles of my invention in connection with specific apparatus it is to be clearly understood that this description is made only by way of example and not as a limitation to the scope of my invention as set forth in the objects thereof and in the accompanying claims.

I claim:

1. A trichroic mirror comprising:
   an optical wedge having a first multilayer dielectric interference filter disposed on a front surface of said wedge and a second multilayer dielectric interference filter disposed on a back surface of said wedge, said back surface being tilted in a given direction and at a given wedge angle with respect to said front surface; and
   a reflecting element spaced from said back surface and tilted in a direction opposite said given direction and at an angle equal to said given wedge angle with respect to said front surface.

2. A trichroic mirror according to claim 1, wherein said reflecting element includes a totally aluminized mirror.

3. A trichroic mirror according to claim 2, wherein said aluminized mirror includes a substrate having a surface thereof adjacent said wedge completely aluminized.

4. A trichroic mirror according to claim 1, wherein said reflecting element is spaced from said back surface by a plurality of mechanical spacers.

5. A trichroic mirror according to claim 1, wherein said first and second filters respond to infrared radiation.

6. A trichroic mirror according to claim 5, wherein said wedge is a 3 by 5 inch rectangular wedge having a thickness of 0.125 inches, and
   said wedge angle is 0.75 milliradians.

7. A trichroic mirror according to claim 1, wherein said wedge is a 3 by 5 inch rectangular wedge having a thickness of 0.125 inches, and
   said wedge angle is 0.75 milliradians.

8. A trichroic mirror according to claim 1, wherein said trichroic mirror produces three separate reflected beams from incident broad band radiation, a first of said three beams being in the 3.5 to 4.0 micron range, a second of said three beams being in the 4.0 to 4.8 micron range and a third of said three beams being in the 4.8 to 5.5 micron range.

9. A trichroic mirror according to claim 8, wherein said third of said three beams is disposed between said first and second of said three beams.

10. A trichroic mirror comprising:
    a dichroic mirror having a back surface and a front surface upon which broad band radiation is incident; and a reflecting element spaced from said back surface and tilted at a given angle with respect thereto;

said dichroic mirror and said reflecting element cooperating to produce three separate reflected beams.

11. A trichroic mirror according to claim 10, wherein a first of said three beams is in the 3.5 to 4.0 micron range, a second of said three beams being in the 4.0 to 4.8 micron range and a third of said three beams being in the 4.8 to 5.5 micron range.

12. A trichroic mirror according to claim 11, wherein said third of said three beams is disposed between said first and second of said three beams.

* * * * *